US011916868B2

(12) United States Patent
Sharma et al.

(10) Patent No.: US 11,916,868 B2
(45) Date of Patent: Feb. 27, 2024

(54) DEVICE BASED SMART NAT SELECTION

(71) Applicant: T-Mobile USA, Inc., Bellevue, WA (US)

(72) Inventors: Nandita Sharma, Issaquah, WA (US); Kyeong Hun An, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/943,427

(22) Filed: Jul. 30, 2020

(65) Prior Publication Data

US 2022/0038420 A1 Feb. 3, 2022

(51) Int. Cl.
| | | |
|---|---|---|
| *H04L 61/256* | (2022.01) | |
| *H04W 8/26* | (2009.01) | |
| *H04W 48/16* | (2009.01) | |
| *H04W 48/18* | (2009.01) | |
| *H04W 8/18* | (2009.01) | |
| *H04W 4/50* | (2018.01) | |

(52) U.S. Cl.
CPC ............. *H04L 61/256* (2013.01); *H04W 4/50* (2018.02); *H04W 8/18* (2013.01); *H04W 8/26* (2013.01); *H04W 48/16* (2013.01); *H04W 48/18* (2013.01)

(58) Field of Classification Search
CPC ....... H04W 36/14; H04W 8/18; H04W 12/08; H04W 12/35; H04W 4/24; H04W 48/18; H04W 76/25; H04W 72/02; H04W 76/11; H04W 88/02; H04L 63/102; H04L 61/256
See application file for complete search history.

(56) References Cited

U.S. PATENT DOCUMENTS

| | | | | |
|---|---|---|---|---|
| 9,860,736 | B1* | 1/2018 | Bruner | H04W 72/02 |
| 10,009,781 | B1* | 6/2018 | Wang | H04L 1/1692 |
| 10,009,825 | B1* | 6/2018 | Marupaduga | H04W 76/40 |
| 10,015,158 | B2* | 7/2018 | Bender | G06F 21/33 |
| 10,440,097 | B1* | 10/2019 | Raza | H04L 67/40 |
| 2002/0164983 | A1* | 11/2002 | Raviv | H04L 67/16 |
| | | | | 455/432.1 |
| 2015/0071225 | A1* | 3/2015 | Krishna | H04L 45/745 |
| | | | | 370/329 |
| 2015/0365829 | A1* | 12/2015 | Grayson | H04W 16/14 |
| | | | | 455/454 |
| 2018/0270646 | A1* | 9/2018 | Gundavelli | H04W 8/04 |
| 2021/0235515 | A1* | 7/2021 | Muthurajan | H04W 8/205 |

\* cited by examiner

*Primary Examiner* — Omer S Mian
(74) *Attorney, Agent, or Firm* — Lee & Hayes, P.C.

(57) ABSTRACT

A method and system for a device-based smart NAT selection. A method includes receiving a request from a user equipment (UE) for access to a mobile network. The method further identifies a configuration profile embedded in the request from the UE. In response to identifying, the mobile network identifies a plurality of connection preferences in the configuration profile. The method further enables the mobile network to select one of the plurality of the connection preferences for accessing the mobile network by the UE. The method further connects the UE to the mobile network according to the selected one of the connection preferences.

14 Claims, 7 Drawing Sheets

DEVICE BASED SMART NAT SELECTION

TECHNICAL FIELD

Embodiments discussed herein generally relate to enhanced device NAT selection.

BACKGROUND

Currently, when a user equipment (UE) is trying to access a mobile network, the mobile network may assign the UE to an IP address of the network provider via a network address translation (NAT) based on the capabilities of the UE. For example, a UE that is a smartphone with 3G and LTE capabilities may select a NAT that is mostly likely capable of handling LTE connectivity.

As such, the UE may request an access based on Mobile Country Codes (MCC), Mobile Network Codes (MNC), and network access types at the network provider side. If the access is found, the UE's request to access the network is approved and no decision-making is undertaken even if one of the other access options may be better than the other. For example, a tablet, a smartwatch or other devices may be capable of various access configurations at the network provider side. However, due to lack of update or other rules, MCC, MNC, or the like may hardcode the selection so that the UE could not select a more appropriate one.

This existing approach, however, fails to accommodate for the appropriate access due to the changes to the UE capabilities.

Therefore, improvements to overcome such shortcomings are needed through technical means.

SUMMARY

Aspects of the invention enable a decision-making process on the UE to dynamically select the NAT. Instead of relying on the hardcode configurations on the network side, embodiments of the invention attach a configuration file of the NAT selection along with the network access request. With such request, aspects of the invention enable the UE the ability trigger the configured access from the configuration file.

Therefore, to overcome the above shortcomings, embodiments attempt to create a technical solution to address the deficiencies of the challenges above.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
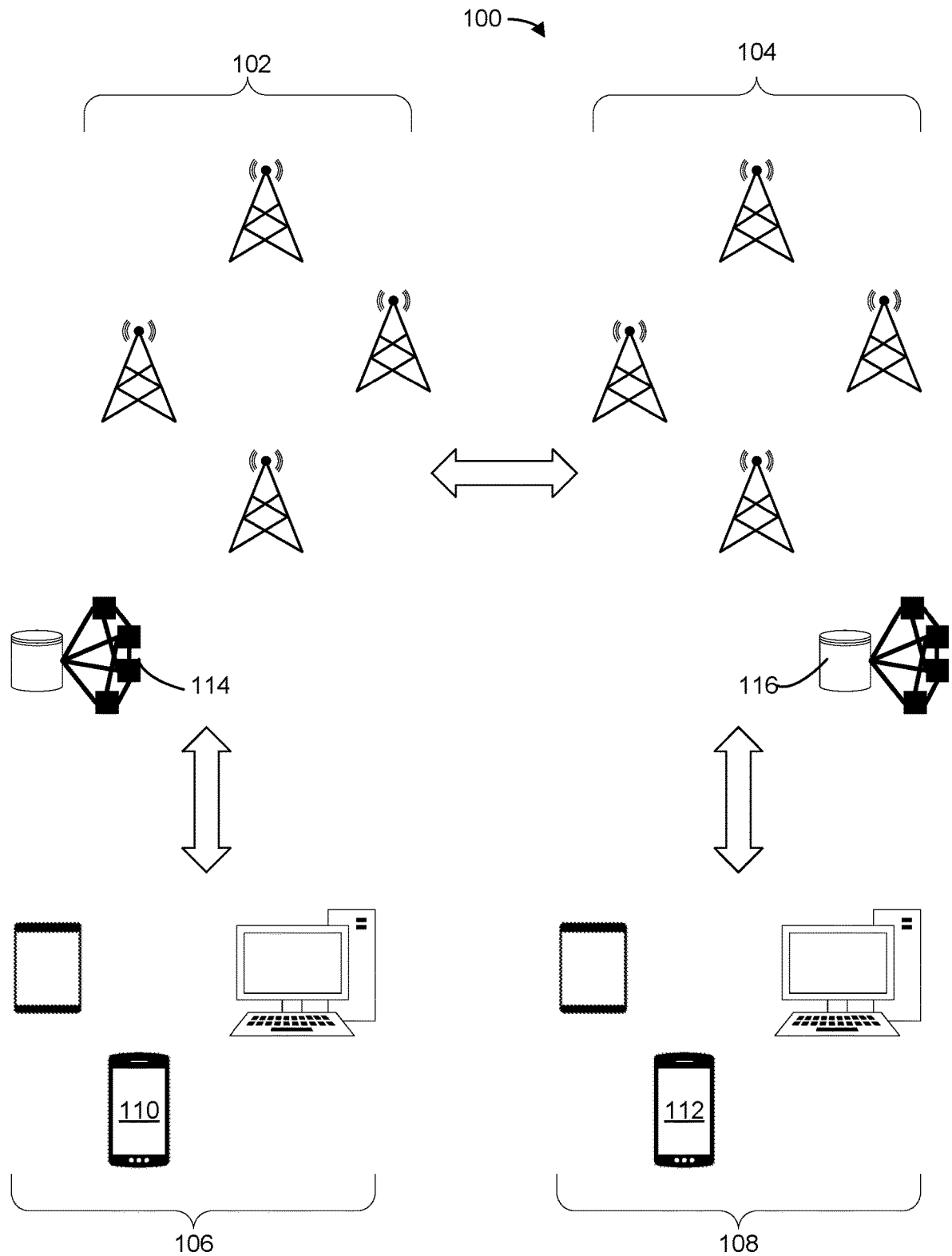
FIG. 1 is a diagram illustrating a system for device-based smart NAT selection according to one embodiment.

Referring now to FIG. 1, a diagram illustrates a system 100 for enabling a device-based network address translation (NAT) selection according to one embodiment. In one embodiment, the system 100 may include a first set of network towers, antennas or cellular stations 102 for handling network traffic. In one embodiment, the first set 102 may be controlled or managed by a first mobile network configuration server 114. In one example, one or more user equipment (UE) 106 may wish to gain access to a mobile network managed by the mobile network configuration server 114 having the first set 102. For example, the set of UE 106 may include a smartphone 110, a tablet and a computer. Similarly, a second set of network towers, antennas or cellular stations 104 may be managed by a second mobile network configuration server 116. Also, a second set of UE 108, which may also include a mobile device 112, is trying to gain access to the mobile network handled by the second mobile network configuration server 116.

In one embodiment, the first and second mobile network server 114 and 116 are part of the same mobile carrier operator. In another embodiment, they may be separate operators but may have cooperating agreements to handle roaming accesses by their respective users.

In an instance where the UE 106 wishes to access the network handled by the mobile network configuration server 116 or vice versa by the UE 108 to the mobile network configuration server 114, the UE 106 may send over a network access request to the respective mobile network configuration servers. However, in the prior approaches, the mobile network configuration server merely follow hard-coded or static table showing the list based on the Mobile Country Codes (MCC), Mobile Network Codes (MNC), and network access types that either of the mobile network configuration servers dictates.

To the contrary, aspects of the invention move away from the conventional hard coded approach. Instead, embodiments of the invention add a configuration file along with the request so that the UE may decide the network preferences rather than having the mobile network configuration server decide the preference. This is additionally useful where more devices are getting access to the mobile network (e.g., Internet of things (IoT), smartwatches, etc.). These devices do not necessarily share the needs as a smartphone and with a device-based selection, a better user experience may be provided.

Figure 2:
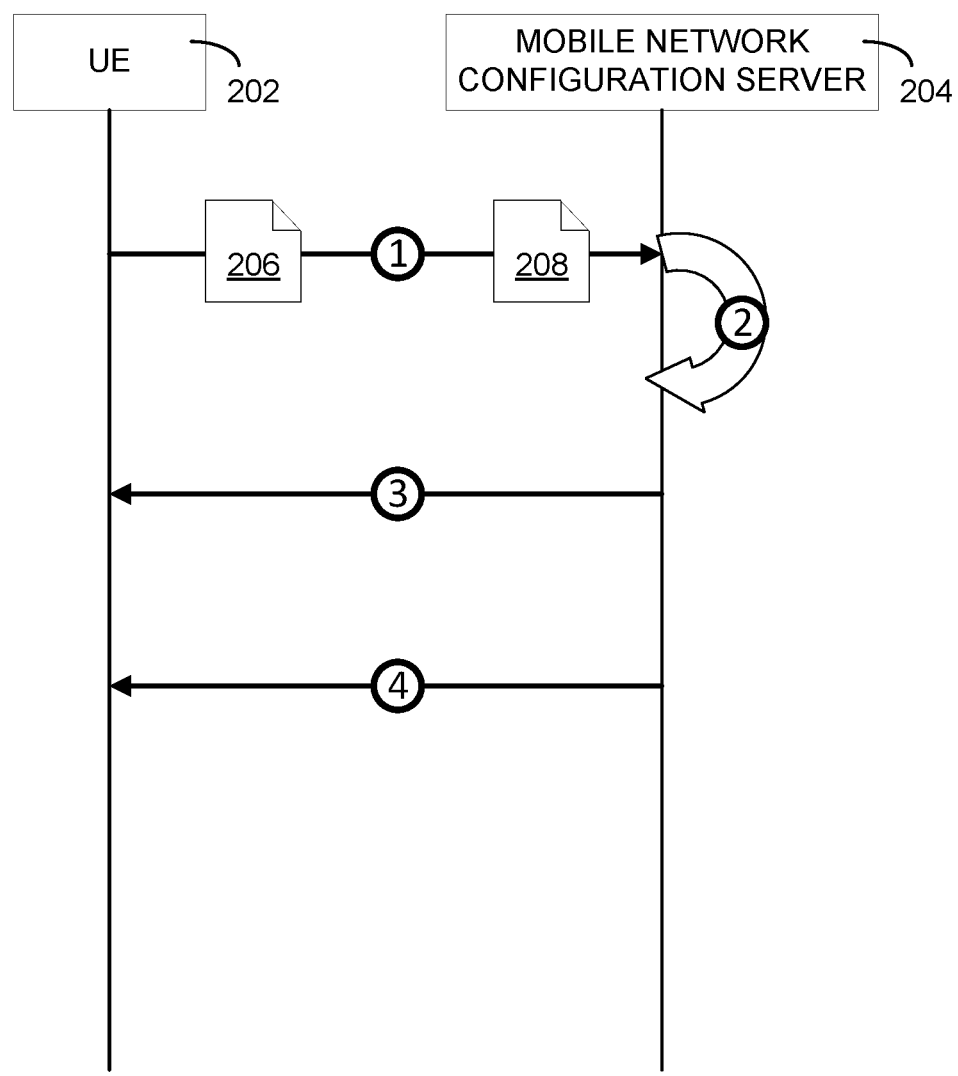
FIG. 2 is a diagram illustrating a request flow according to one embodiment.
Figure 3:
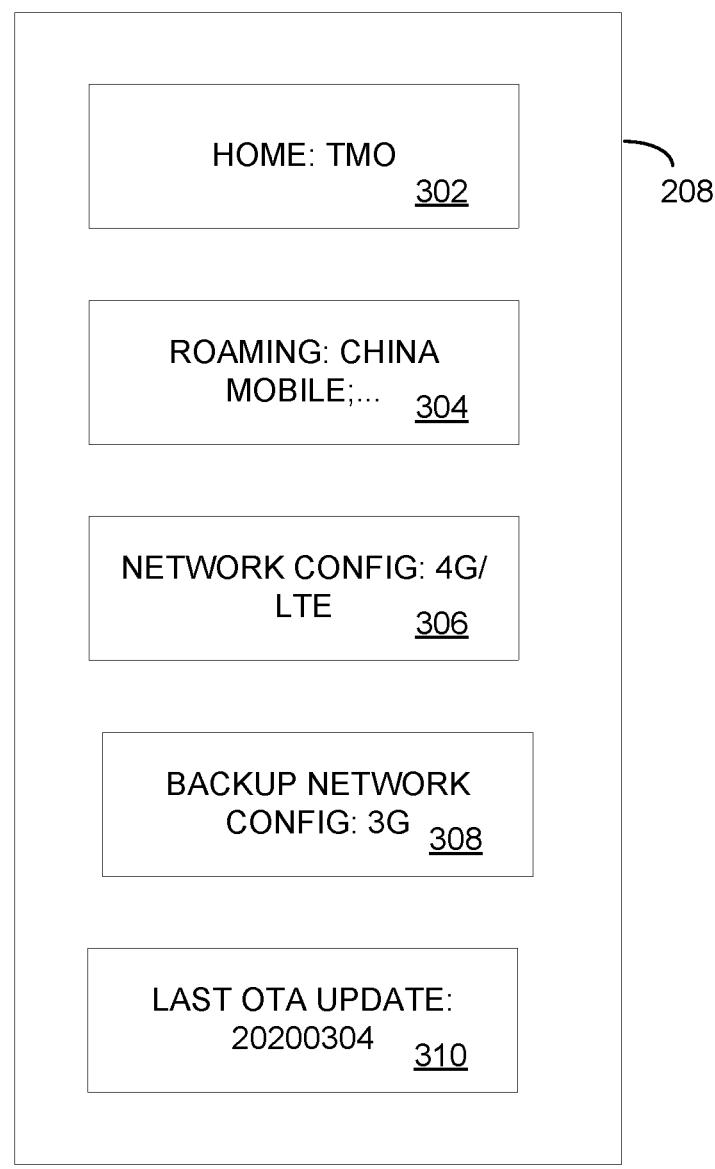
FIG. 3 is a diagram illustrating a configuration profile according to one embodiment.

Referring now to FIGS. 2 and 3, a diagram illustrates a request flow and a diagram illustrating an example configuration profile according to one embodiment. In one example, a UE 202, such as the UE 106 or 108, may send a network access request 206 at 1 to a mobile network configuration server 204 (e.g., 114 or 116). In addition, the request 206 may include a configuration profile 208. In one embodiment and referring now to FIG. 3, the profile 208 may include at least one of the following configuration settings or rules: a home network configuration 302, a roaming network configuration 304, a network configuration setting 306, a backup network configuration setting 308 and last update information 310. The settings 208 may be updated through an over-the-air setup so that the configuration settings are updated on the UE 202.

Referring back to FIG. 2, in response to the request 206, the mobile network configuration server 204 may review the configuration profile 208 to identify the settings therein at 2. For example, suppose the configuration profile 208 includes the roaming network configuration 304 that the mobile network configuration server 204 could not handle, the mobile network configuration server 204 may deny the request 206 at 3. On the other hand, if the roaming network configuration 304 and the network configuration setting 306 are supported by the mobile network configuration server 204, then the request 206 may be granted at 4.

Aspects of the invention differ from the prior approach where the mobile network configuration server (e.g., 204) is the sole entity that selects or determines the network configurations for the UE 202. This may be convenient but the convenience fails to accommodate the up and coming changes and advances in the UE's network capabilities and specific needs.

Referring back to FIG. 2 again, at 3, if the request 206 was denied, the UE 202 may receive an error. In another alternative embodiment, the mobile network configuration server 204 may send a prompt to the UE 202 to choose a default configuration for the access by the UE 202.

At 4, once granted, the UE 202's subscriber's identity module (SIM) may receive an authentication to access the network.

Figure 4A:
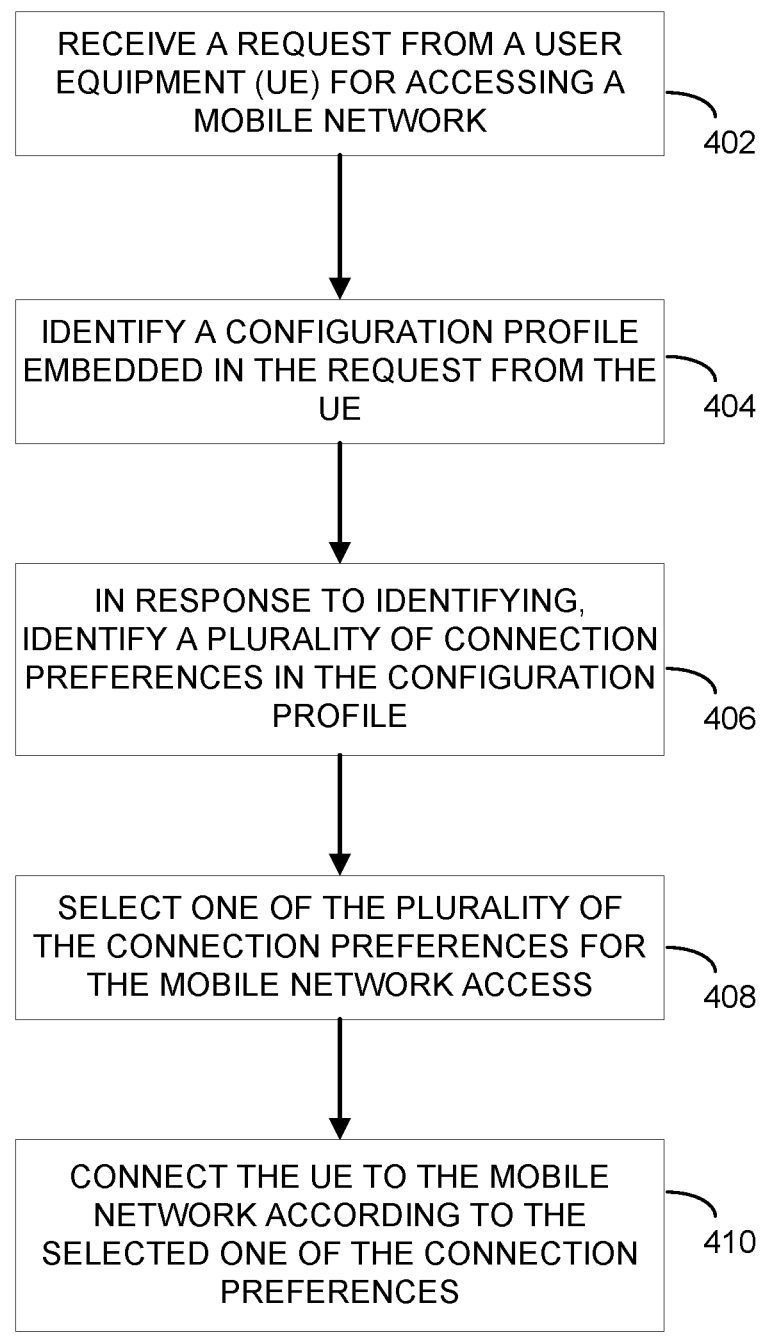
FIG. 4A is a flow chart illustrating a method for enabling a device-based smart NAT selection according to one embodiment.

Referring now to FIG. 4A, a flow chart illustrates a method for enabling a device-based smart NAT selection according to one embodiment. At 402, a mobile network configuration server may receive a request from a UE for accessing a mobile network. The mobile network configuration server may identify a configuration profile embedded in the request from the UE at 404. At 406, the mobile network configuration server may identify a plurality of connection preferences in the configuration profile. In one embodiment, the mobile network configuration server may select one of the plurality of the connection preferences for the mobile network access at 408. The mobile network configuration server may connect the UE to the mobile network according to the selected one of the connection preferences at 410, (e.g., after granting the request).

Figure 4B:
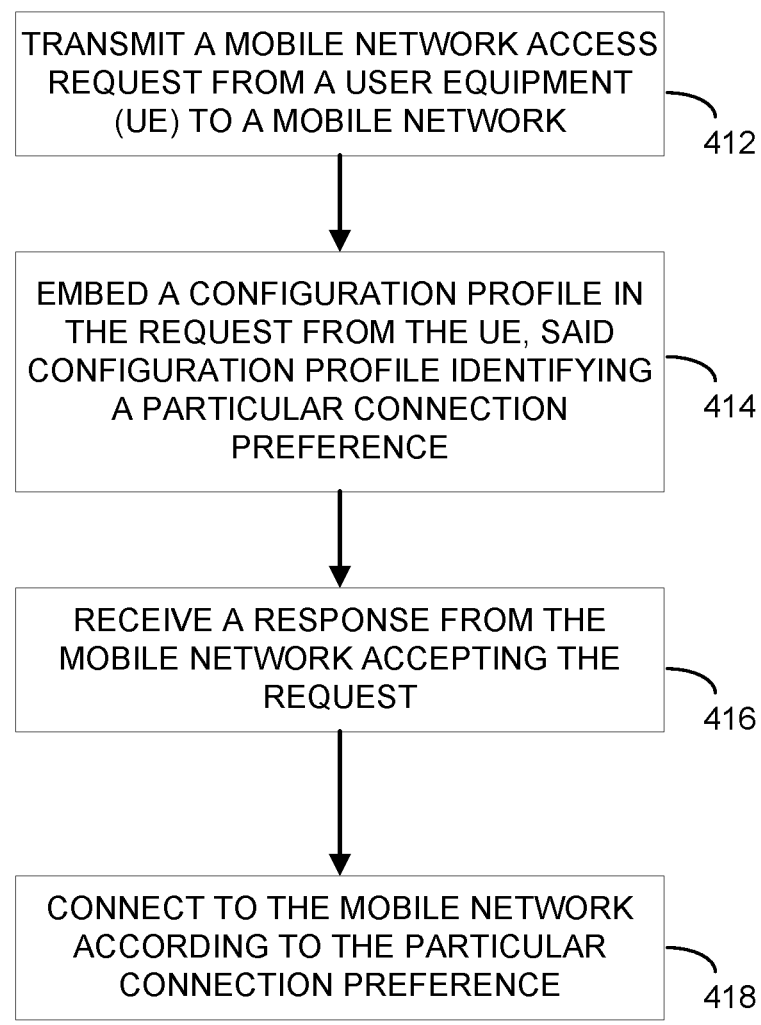
FIG. 4B is a flow chart illustrating a method for requesting a device-based smart NAT selection according to one embodiment.

Referring now to FIG. 4B, a flow chart illustrates a method for requesting a device-based smart NAT selection according to one embodiment. For example, the UE may wish to access a mobile network either as a result of roaming or as a result of updates to the configuration profile. In one embodiment, the UE may have the network profile natively installed with the UE. In another embodiment, the UE may have an application installed thereon that generates the configuration profile. At 412, the UE may transmit a mobile network access request from the UE to a mobile network (e.g., to a mobile network configuration server). At 414, the UE may embed or attach a configuration profile in the request. The configuration profile may include or identify a particular connection preference. At 416, the UE may receive a response from the mobile network accepting the request. The UE is then connect to the mobile network according to the particular connection preference at 418.

Figure 5:
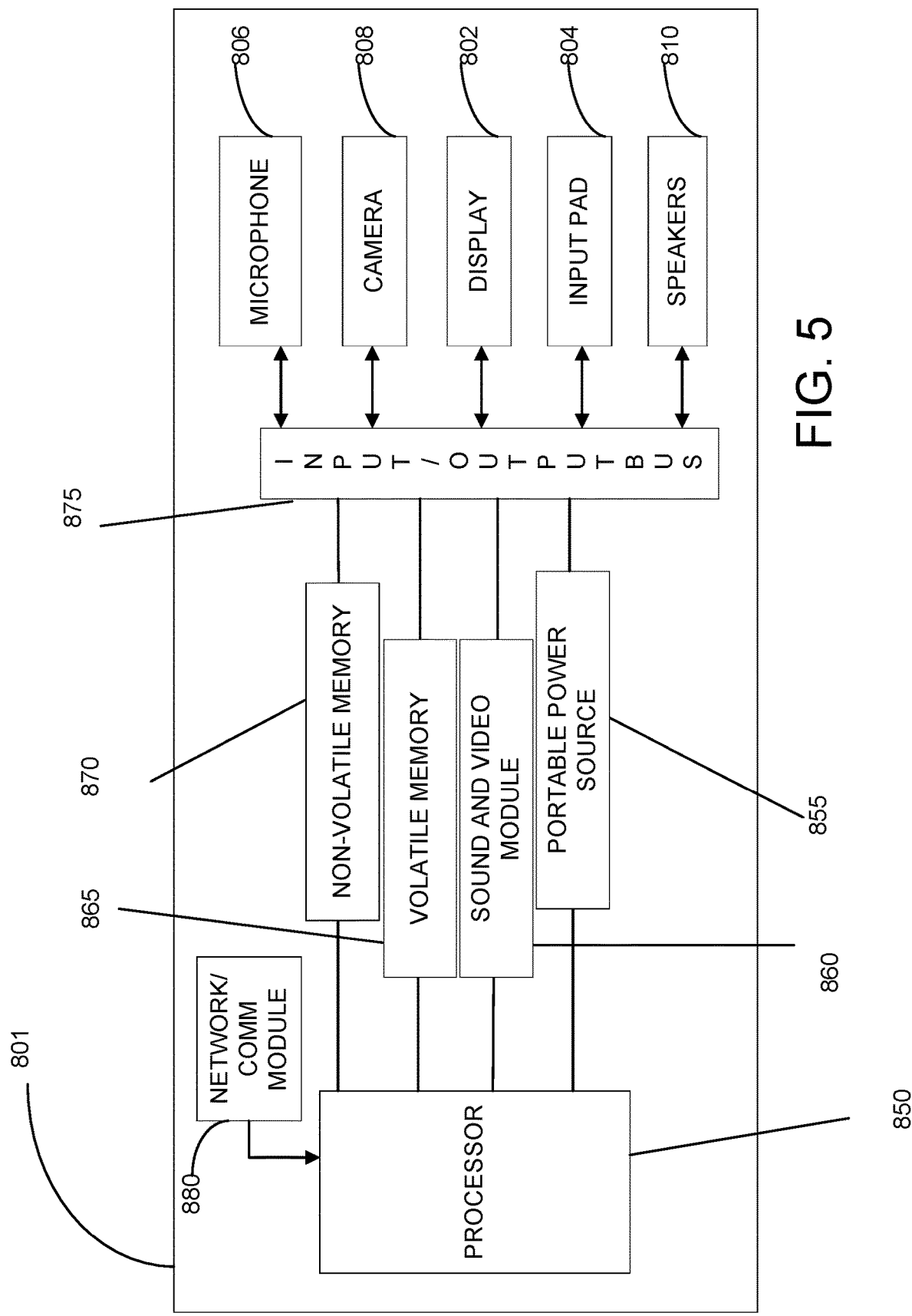
FIG. 5 is a diagram illustrating a portable computing device according to one embodiment.
Figure 6:
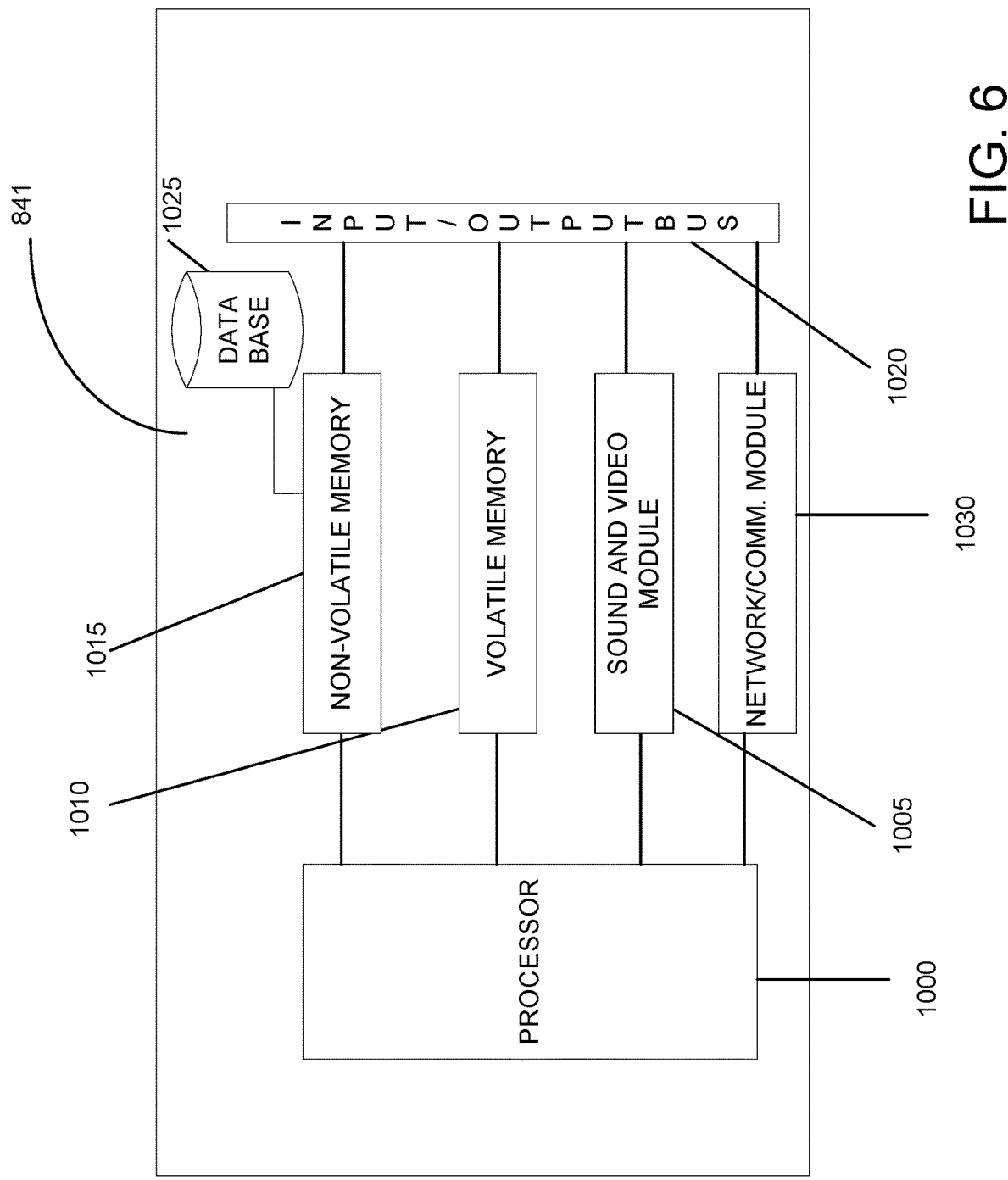
FIG. 6 is a diagram illustrating a computing device according to one embodiment.

FIG. 5 may be a high level illustration of a portable computing device 801 communicating with a remote computing device 841 in FIG. 6 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges of relying on existing practices of content filtering—a hardware solution. Rather, with the flexibility and decoupling of the user plane and the control plane, aspects of the invention may more efficiently accomplish content filtering without being tied to hardware-dependent.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method for selectively configure a mobile network access comprising:
   receiving, by a mobile network configuration server, a request from a user equipment (UE) for access to a mobile network, the request including a configuration profile associated with the UE;
   identifying, by the mobile network configuration server, a plurality of connection preferences corresponding to different access configurations in the configuration profile, at least some of the different access configurations correspond to different circuits in the UE and at least one of the different access configurations comprises a last update configuration indicating a date on which the different access configurations were last updated on the UE by the mobile network; and
   comparing, by the mobile network configuration server, capabilities of the mobile network configuration server with the plurality of connection preferences;
   when the comparing indicates that the capabilities of the mobile network configuration server support the plurality of connection preferences, selecting one of the plurality of the connection preferences for the mobile network access before connecting the UE to the mobile network according to the selected one of the connection preferences, wherein the selected connection preference is different from a static table showing a list of connections based on a Mobile Country Codes (MCC), Mobile Network Codes (MNC) or network access types dictated by the mobile network configuration server; and
   when the comparing indicates that the capabilities of the mobile network configuration server do not support the plurality of connection preferences, denying the request and sending a prompt to the UE to choose a default configuration after denying the request.

2. The computer-implemented method of claim 1, wherein receiving comprises receiving the request in response to a change of one mobile network access point to another mobile network access point.

3. The computer-implemented method of claim 1, further comprising comparing the selected one of the plurality of the connection preferences to a list of agreed access configurations.

4. The computer-implemented method of claim 3, wherein the list of agreed access configurations includes one or more of the following: a list of mobile country codes (MCC), a list of mobile network codes (MNC), a list of network access types, and a list of devices.

5. The computer-implemented method of claim 1, wherein the configuration profile comprises profile information for configuring a network address translation (NAT) selection.

6. A computer-implemented method for selectively configure a mobile network access comprising:
   transmitting a mobile network access request from a user equipment (UE) to a mobile network configuration server, wherein the mobile network access request is embedded with a configuration profile therein, said configuration profile comprising a plurality of connection preferences to be selected, by the mobile network configuration server, for the UE when connecting to the mobile network configuration server, wherein the plurality of connection preferences correspond to different access configurations in the configuration profile, at least some of the different access configurations correspond to different circuits in the UE and at least one of the different access configuration comprises a last update configuration indicating a data on which the different access configurations were last updated on the UE by the mobile network, and wherein the plurality of connection preferences is different from a static table showing a list of connections based on Mobile Country Codes (MCC), Mobile Network Codes (MNC) or network access types dictated by the mobile network configuration server;
   causing the mobile network configuration server to compare capabilities of the mobile network configuration server with the configuration profile;
   receiving a response from the mobile network accepting the request when the capabilities of the mobile network configuration server support the plurality of connection preferences, wherein the response comprises: a connection with a mobile network configuration server after the mobile network configuration server analyzed the configuration profile embedded in the request from the UE and determined, in response to capabilities of the mobile network configuration server, to select one of the plurality of the connection preferences for the mobile network access before connecting the UE to the mobile network; and receiving a response from the mobile network denying the request when the capabilities of the mobile network configuration server do not support the plurality of connection preferences, wherein the response comprises: a prompt to the UE to choose a default configuration after the mobile network configuration server denied the request.

7. The computer-implemented method of claim 6, wherein transmitting comprises transmitting the mobile network access request in response to a change of one mobile network access point to another mobile network access point.

8. The computer-implemented method of claim 6, further comprising comparing a particular connection preference to a list of agreed access configurations provided by the mobile network.

9. The computer-implemented method of claim 8, wherein the list of agreed access configurations includes one or more of the following: a list of mobile country codes (MCC), a list of mobile network codes (MNC), a list of network access types, and a list of devices.

10. The computer-implemented method of claim 6, wherein the configuration profile comprises profile information for configuring a network address translation (NAT) selection.

11. A system for selectively configure a mobile network access comprising:
  a user equipment (UE) transmitting a request to access to a mobile network, said request including a configuration profile embedded therein, wherein the configuration profile comprises profile information for configuring a network address translation (NAT) selection;
  a mobile network configuration server for the mobile network configured for receiving the request from the UE for accessing the mobile network;
  wherein the mobile network configuration server is configured to identify the configuration profile embedded in the request from the UE, wherein the configuration profile comprises a plurality of connection preferences corresponding to different access configurations in the configuration profile, at least some of the different access configurations correspond to different circuits in the UE and at least one of the different access configuration comprises a last update configuration indicating a data on which the different access configurations were last updated on the UE by the mobile network, and wherein at least one of the plurality of connection preferences is to be selected, by the mobile network configuration server, for the UE when connecting to the mobile network configuration server;
  in response to identifying, the mobile network configuration server configured to compare capabilities of the mobile network configuration server with the configuration profile;
  in response to the comparing, when the capabilities of the mobile network configuration server supporting the plurality of connection preferences:
  the mobile network configuration server is configured to select one of the plurality of the connection preferences for the mobile network access by the UE wherein the mobile network configuration server is configured to connect the UE to the mobile network according to the selecting, wherein the selected connection preference is different from a static table showing a list of connections based on Mobile Country Codes (MCC), Mobile Network Codes (MNC) or network access types dictated by the mobile network configuration server; and
  in response to the comparing, when the capabilities of the mobile network configuration server supporting the plurality of connection preferences:
  the mobile network configuration server is configured to send a prompt to the UE to choose a default configuration after denying the request.

12. The system of claim 11, wherein the UE transmits the request in response to a change of one mobile network access point to another mobile network access point.

13. The system of claim 11, wherein the mobile network configuration server is configure to compare the selected one of the plurality of the connection preferences to a list of agreed access configurations.

14. The system of claim 13, wherein the list of agreed access configurations includes one or more of the following: a list of mobile country codes (MCC), a list of mobile network codes (MNC), a list of network access types, and a list of devices.

* * * * *